United States Patent
Dhoot et al.

(10) Patent No.: US 12,041,050 B2
(45) Date of Patent: Jul. 16, 2024

(54) WIRELESS POWER TRANSMISSION SIGNAL BASED AUTHENTICATION

(71) Applicant: INTERNATIONAL BUSINESS MACHINES CORPORATION, Armonk, NY (US)

(72) Inventors: Akash U. Dhoot, Pune (IN); Shailendra Moyal, Pune (IN); Venkata Vara Prasad Karri, Visakhapatnam (IN); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 17/651,267

(22) Filed: Feb. 16, 2022

(65) Prior Publication Data
US 2023/0262058 A1 Aug. 17, 2023

(51) Int. Cl.
*H04L 9/40* (2022.01)
(52) U.S. Cl.
CPC ........ *H04L 63/0876* (2013.01); *H04L 63/083* (2013.01); *H04L 63/0884* (2013.01)
(58) Field of Classification Search
CPC ............... H04L 63/083; H04L 63/0876; H04L 63/0884
USPC .......................................................... 726/7
See application file for complete search history.

(56) References Cited

U.S. PATENT DOCUMENTS

| | | | |
|---|---|---|---|
| 8,248,026 B2 | 8/2012 | Sip | |
| 9,124,583 B1 * | 9/2015 | Amaladoss | ......... H04L 63/0876 |
| 9,444,282 B2 | 9/2016 | Won | |
| 9,615,254 B2 | 4/2017 | Lord | |
| 9,775,038 B2 * | 9/2017 | Ko | ........................ H04W 12/08 |
| 10,057,262 B2 * | 8/2018 | Yokoyama | ............ H04L 9/3271 |
| 10,103,552 B1 | 10/2018 | Leabman | |
| 10,178,093 B2 * | 1/2019 | Favila | ..................... H04L 67/10 |
| 10,910,882 B2 | 2/2021 | Smith | |
| 11,463,438 B2 * | 10/2022 | August | ................... H04L 67/54 |
| 2013/0257364 A1 | 10/2013 | Redding | |

(Continued)

FOREIGN PATENT DOCUMENTS

WO 201717156 A1 2/2017

OTHER PUBLICATIONS

Commotion wireless.net, "Learn Wireless Basics", https://commotionwireless.net/docs/cck/networking/learn-wireless-basics/, accessed Nov. 9, 2021, pp. 1-1.

(Continued)

*Primary Examiner* — Amare F Tabor
(74) *Attorney, Agent, or Firm* — Tihon Poltavets

(57) ABSTRACT

A method for authenticating a device based on a wireless power transmission signal includes receiving, at an authenticating device, a wireless power transmission signal for authentication of a user device attempting to accessing a resource, where the wireless power transmission signal includes a unique identifier for the user device. The method further includes translating, at the authenticating device, the wireless power transmission signal, wherein the unique identifier for the user device is embedded in the wireless power transmission signal as a bit representation. In response to authenticating the user device based on a translated wireless power transmission signal, the method further includes granting, the user device, access to the resource.

20 Claims, 6 Drawing Sheets

(56) References Cited

U.S. PATENT DOCUMENTS

| | | | | |
|---|---|---|---|---|
| 2016/0191511 A1* | 6/2016 | Tijerina | ................ | A61B 5/318 |
| | | | | 726/7 |
| 2017/0110910 A1 | 4/2017 | Zeine | | |
| 2018/0316390 A1* | 11/2018 | Wang | ...................... | H04B 5/72 |

OTHER PUBLICATIONS

Dukak et al., "Implementation of Secure Communication via the RF Module for Data Acquistion", Hindawi Journal of Sensors, Research Article, vol. 2019, Article ID 7810709, https://doi.org/10.1155/2019/7810709, pp. 1-17.

Ji et al., "A new method of encryption wireless energy transmission for EV in the smart grid", CES Transactions on electrical machines and systems, vol. 1, No. 3, Dec. 2017, pp. 1-6.

Liu et al., "Safe and Secure Wireless Power Transfer Networks: Challenges and Opportunities in RF-Based Systems", arXiv:1601.05648v2 [cs.NI] Feb. 11, 2016, pp. 1-11.

Mell et al., "The NIST Definition of Cloud Computing", National Institute of Standards and Technology, Special Publication 800-145, Sep. 2011, pp. 1-7.

Narayanan et al., "Secure Wireless Transmission of Data via Encryption and Frequency Hopping", EE318 Electronic Design Lab Project Report, EE Dept., IIT Bombay, Apr. 2007, pp. 1-11.

Shafagh et al., "Poster: Come Closer-Proximity-based Authentication for the Internet of Things", https://dl.acm.org/doi/pdf/10.1145/2639108.2642904, ACM, MobiCom' 14, Sep. 7, 2014, pp. 1-3.

Zhang et al., "Energy Encryption for Wireless Power Transfer", IEEE Tranactions on Power Electronics, Sep. 2015, ResearchGate, https://www.researchgate.net/publication/275055663, pp. 1-11.

* cited by examiner

US 12,041,050 B2

WIRELESS POWER TRANSMISSION SIGNAL BASED AUTHENTICATION

BACKGROUND

This disclosure relates generally to wireless power transmission, and in particular to authenticating a device based on a wireless power transmission signal.

Wireless power transmission (WPT) is the transmission of electrical energy through a medium that lacks a physical link. For a WPT system, a transmitter device with an electrical power source generates a varying electromagnetic field, which travels across space to a receiver device. The receiver device extracts power from the varying electromagnetic field and supplies the power to an electrical load. The WPT system also allows for the transmitter device and receiver device to communicate. The communication allows for the transmitter device to detect and identify a presence of the receiver device, to adjust an amount of power transmitted by the transmitter device, and to monitor various conditions during the power transfer.

SUMMARY

Embodiments in accordance with the present invention disclose a method, computer program product and computer system for authenticating a device based on a wireless power transmission signal, the method, computer program product and computer system can receive, at an authenticating device, a wireless power transmission signal for authentication of a user device attempting to accessing a resource, wherein the wireless power transmission signal includes a unique identifier for the user device. The method, computer program product and computer system can translate, at the authenticating device, the wireless power transmission signal, wherein the unique identifier for the user device is embedded in the wireless power transmission signal as a bit representation. The method, computer program product and computer system can, responsive to authenticating the user device based on a translated wireless power transmission signal, grant, the user device, access to the resource.

DETAILED DESCRIPTION

Embodiments of the present invention authenticate a user device attempting to access a resource based on a wireless power transmission (WPT) signal transmitted to an authenticating device. As the user device (i.e., accessing device) approaches an authenticating device, the user device transmits a WPT signal to the authenticating device. The WPT signal includes variations in emitted electromagnetic fields based on a rate and frequency of ions being transferred between an integrated transmitter on the user device and an integrated receiver on the authenticating device. The variations in emitted electromagnetic fields are a bit representation of the authentication credentials for the user device. Embodiments of the present invention receive, at the authenticating device, the WPT signal for authentication of the user device to access a resource and translate the WPT signal into authentication credentials for the user device (e.g., device serial number, password). In addition to the authentication credentials, the WPT signal can include additional context for the authentication credentials for a multi-factor authentication requirement to access the resource. Embodiments of the present invention authenticate the user device based on the translated signal and in the event the user device is authenticated, the user device is granted access to the resource.

Embodiment of the present invention provide technological improvements in data and device security through WPT based authentication. WPT is the transmission of electrical energy through electromagnetic fields which is a medium that lacks a physical link. Embodiment of the present invention can include a single factor authentication system between the user device attempting to access a resource and an authenticating device to authenticate the user device based on a WPT signal emitted by the user device. The WPT signal is coded utilizing variations in the emitted electromagnetic fields (e.g., two distinctly different frequencies) to include a bit representation for a unique identifier for the user and/or the user device. Embodiment of the present invention can include a multi-factor authentication system between the user device attempting to access a resource and an authenticating device authenticating the user device based on a WPT signal emitted by the user device with additional context. The additional context can be a user action (e.g., device orientation) that is embedded in the WPT signal. The WPT signal is coded utilizing variations in the emitted electromagnetic fields (e.g., two distinctly different frequencies) to include a bit representation for a unique identifier for the user and/or the user device, along with a bit representation for the additional context. Furthermore, utilizing WPT signals for user device authentications allows for credentials to be presented and transferred to an authenticating device without the credentials being viewable by others located in the vicinity.

Figure 1:
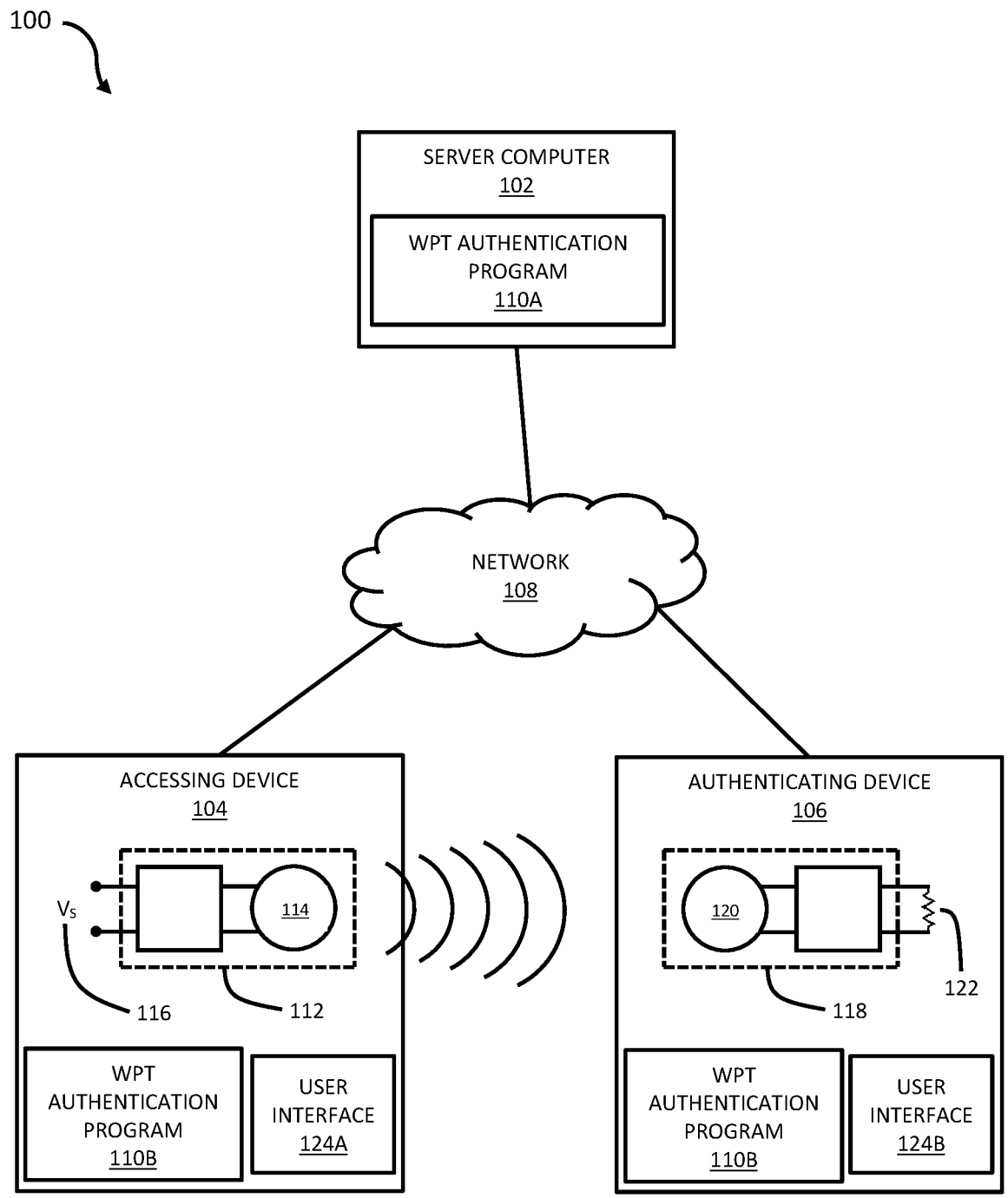
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 102, accessing device 104, and authenticating device 106, all interconnected over network 108. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with accessing device 104, authenticating device 106, and other computing devices (not shown) within the distributed data processing environment via network 108. In another embodiment, server computer 102 represents a computing system utilizing clustered computers and components (e.g., database server computers, application server computers, etc.) that act as a single pool of seamless resources when accessed within the distributed data processing environment. Server computer 102 includes server-side wireless power transmission (WPT) authentication program 110A for performing the operational step discussed with regards to FIG. 3B.

Accessing device 104 can be a laptop computer, a tablet computer, a smart phone, smartwatch, a smart speaker, or any programmable electronic device with an integrated transmitter 112. Accessing device 104 can communicate with various components and devices within the distributed data processing environment (e.g., server computer 102 and authenticating device 106), via network 108. Accessing device 104 can be a wearable computer, which represents a miniature electronic device that may be worn by the bearer under, with, or on top of clothing, as well as in or connected to glasses, hats, or other accessories. In the embodiments discussed herein, accessing device 104 represents an electronic device associated with a user accessing a resource requiring authentication by authenticating device 106. Accessing device 104 includes an instance of WPT authentication program 110B, integrated transmitter 112 with transmitting antenna 114, power source 116, and user interface 124A. Authenticating device 106 can be a laptop computer, a tablet computer, a smart phone, a smart lock, or any programmable electronic device with an integrated receiver 118. Authenticating device 106 can communicate with various components and devices within the distributed data processing environment (e.g., server computer 102 and accessing device 104), via network 108. In the embodiments discussed herein, authenticating device 104 represents an electronic device for authenticating an electronic device (e.g., accessing device 104) prior to granting the electronic device access to a resource. Authenticating device 106 includes an instance of WPR authentication program 110B, integrated receiver 118 with receiving antenna 120, load 122, and user interface 124B.

The combination of integrated transmitter 112 and integrated receiver 118 represent an example of a WTP system for transmitting various types of electromagnetic energy, such as, time varying electric fields. Power source 116 electrically coupled to integrated transmitter 112 provides power which is transmitted in the form of electromagnetic energy via transmitting antenna 114 towards receiving antenna 120 of integrated receiver 118. Integrated receiver 118 can receive the power via the electromagnetic energy and convert the electromagnetic energy to direct current (DC) or alternating current (AC) electrical current for utilization by load 122. In the embodiments discussed below, integrated transmitter 112 produces an electromagnetic energy signature that is distinctly unique to accessing device 104 and utilized by WPT authentication program 110 to authenticate accessing device 104 prior to granting access to a resource. A resource can include an electronic device, an electronic system, and/or electronic content.

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks capable of receiving and transmitting data, voice, and/or video signals, including multimedia signals that include voice, data, and video information. In general, network 108 can be any combination of connections and protocols that will support communications between server computer 102, accessing device 104, authenticating device 106, and other computing devices (not shown) within the distributed data processing environment.

WPT authentication program 110 authenticates accessing device 104 based on a wireless power transmission signal transmitted to authenticating device 106. In a first embodiment, WPT authentication program 110B operating on authenticating device 106 locally authenticates accessing device 104 based on a wireless power transmission signal transmitted to authenticating device 106, without communicating with WPT authentication program 110A operating on server computer 102. The first embodiment is discussed in detail with regards to FIG. 2. In a second embodiment, WPT authentication program 110B operating on authenticating device 106 authenticates accessing device 104 based on a wireless power transmission signal transmitted to authenticating device 106 by communicating with WPT authentication program 110A operating on server computer 102 via network 108. WPT authentication program 110A operating on server computer 102 represent a cloud-based security-based system for storing various authentication signals for various electronic devices, such as, accessing device 104. The second embodiment is discussed in detail with regards to FIG. 3A and FIG. 3B.

In the first embodiment, WPT authentication program 110B on authenticating device 106 receives a WPT signal for authentication of accessing device 104 attempting to access a resource. WPT authentication program 110B translates the WPT signal and authenticates accessing device 104 based on the translated signal. In the event WPT authentication program 110B authenticates accessing device 104, WPT authentication program 110B grants access to the recourse. In the event WPT authentication program 110B fails to authenticate accessing device 104, WPT authentication program 110B denies access to the resource. For a single-step authentication process, WPT authentication program 110B operating on accessing device 104 sends the WPT signal to authenticating device 106, where the WPT signal includes a coded unique identifier for accessing device 104. The unique identifier can be based on a serial number for accessing device 104. For a two-step authentication, WPT authentication program 110B operating on accessing device 104 sends the WPT signal to authenticating device 106, where the WPT signal includes a coded unique identifier for accessing device 104 and a user provided context for accessing device 104. The user provided context for accessing device 104 can be based on a specific user, a specific resource, and/or based on a specific type of device. WPT authentication program 110B on accessing device 104 determines a bit representation of the coded unique identifier and the user provided context and sends, via integrated transmitter 112, the bit representation in a WPT signal utilizing varying amounts of ions or time varying electric fields. WPT authentication program 110B on authenticating device 106 receives the WPT signal, via integrated receiver 118, for authentication of accessing device 104 attempting to access a resource.

In the second embodiment, WPT authentication program 110B on authenticating device 106 receives a WPT signal for authentication of accessing device 104 attempting to access a resource. WPT authentication program 110B translates the WPT signal to a digital signal and send the digital signal to WPT authentication program 110A on server computer 102 for authentication. WPT authentication program 110A on server computer 102 receives, as a digital signal, the translated WPT signal for accessing device 104 and authenticates accessing device 104. WPT authentication program 110A sends the authentication information to authenticating device 106, where WPT authentication program 110B receives the authentication information for accessing device 104. In the event WPT authentication program 110B authenticates accessing device 104, WPT authentication program 110B grants access to the recourse. In the event WPT authentication program 110B fails to authenticate accessing device 104, WPT authentication program 110B denies access to the resource. Similar to the first embodiment discussed above, for a single-step authentication process, WPT authentication program 110B operating on accessing device 104 sends the WPT signal to authenticating device 106, where the WPT signal includes a coded unique identifier for accessing device 104. The unique identifier can be based on a serial number for accessing device 104. For a two-step authentication, WPT authentication program 110B operating on accessing device 104 sends the WPT signal to authenticating device 106, where the WPT signal includes a coded unique identifier for accessing device 104 and a user provided context for accessing device 104. The user provided context for accessing device 104 can be based on a specific user, a specific resource, and/or based on a specific type of device. WPT authentication program 110B on accessing device 104 determines a bit representation of the coded unique identifier and the user provided context and sends, via integrated transmitter 112, the bit representation in a WPT signal utilizing varying amounts of ions or time varying electric fields. WPT authentication program 110B on authenticating device 106 receives the WPT signal with the bit representation and translates the WPT signal with the bit representation to a digital signal, which is subsequently sent to WPT authentication program 110A on server computer 102 for authentication.

User interface 124A on accessing device 104 and user interface 124B on authenticating device 106 each enable a user to make requests of or issue commands to server computer 102 via network 108. User interface 124A and 124B also enables each of the users to receive information and instructions in response on respective accessing device 104 and authenticating device 106 via network 108. In one embodiment, user interface 124A and 124B may each be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 124A and 124B enables a user to interact with an instance of WPT authentication program 110B on respective accessing device 104 and authenticating device 106 and to interact with an instance of WPT authentication program 110A operating on server computer 102.

Figure 2:
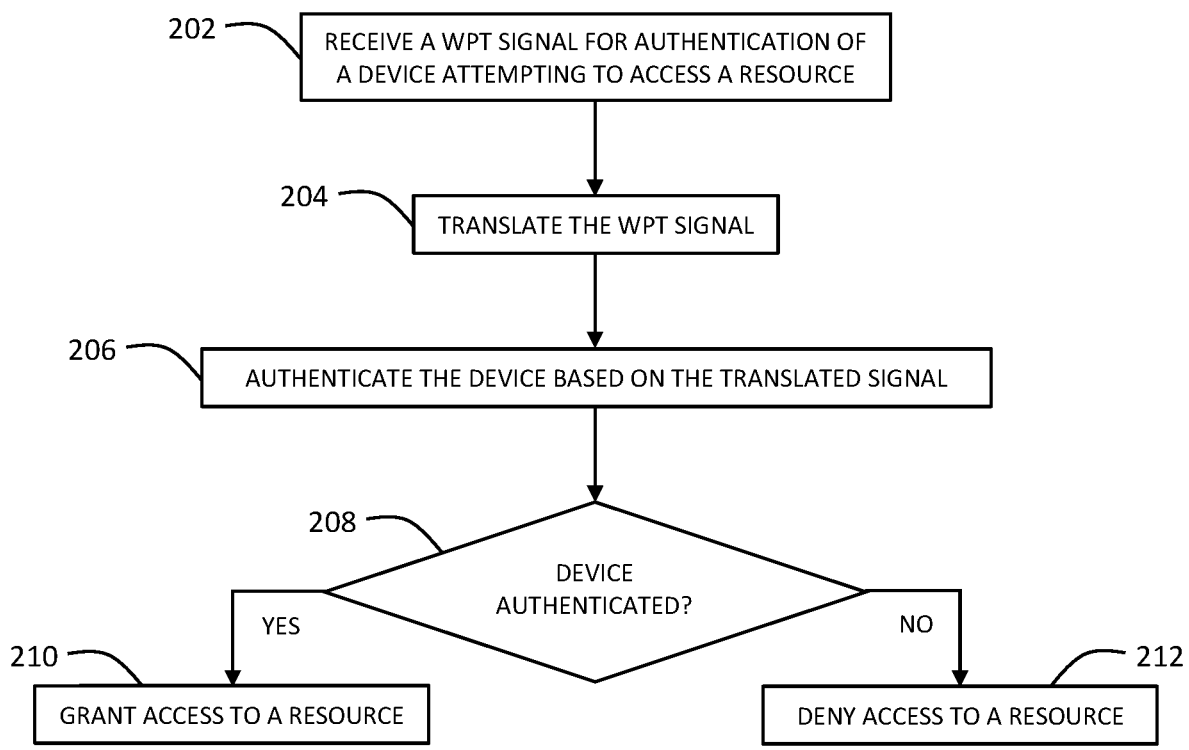
FIG. 2 is a flowchart depicting operational steps of a wireless power transmission program operating on an authenticating device for authenticating a device attempting to access a resource, in accordance with an embodiment of the present invention.

FIG. 2 is a flowchart depicting operational steps of a wireless power transmission program operating on an authenticating device for authenticating a device attempting to access a resource, in accordance with an embodiment of the present invention.

WPT authentication program 110 receives a WPT signal for authentication of a device attempting to access a resource (202). For a single factor authentication of the device attempting to access the resource (i.e., an accessing device), the device sends a WPT signal via an integrated transmitter to an integrated receiver on an authenticating device 106 with a unique identifier to authenticate the device. The WPT signal is coded utilizing variations in the emitted electromagnetic fields (e.g., two distinctly different frequencies with varying amounts of ions) to include a bit representation for a unique identifier for the device and/or a user of the device. In one example, an authenticating device is associated with a smart lock, where a user is attempting to open the smart lock with a smart phone. The opening the smart lock represents the resource being accessed and the smart phone represents the device attempting to access the resource requiring authentication by the authenticating device. The smart phone sends a WPT signal with variations in the emitted electromagnetic fields that includes a bit representation for a serial number (i.e., unique identifier) for the smart phone, where WPT authentication program 110 authenticates the smart phone based on the serial number to open the smart lock (i.e., grant access to the resource). In another example, an authenticating device is associated with a server computer located at a customer site, where a user is attempting to access the server computer locally at the customer site with a tablet computer. Locally accessing the server computer represents the resource and the tablet computer represents the device attempting to access the resource requiring authentication by the authenticating device. The tablet computer sends a WPT signal with variations in the emitted electromagnetic fields that includes a bit representation for a username and password for accessing the server computer, where WPT authentication program 110 authenticates the tablet computer based on the provided username and password.

For a multi-factor authentication of the device attempting to access the resource (i.e., an accessing device), the device sends a WPT signal via an integrated transmitter to an integrated receiver on an authenticating device 106 with a unique identifier to authenticate the device and context for the device. Context represents an additional one or more factors for authenticating device and can be based on a device holding pattern, a gesture type, a proximity to the authenticating device, an orientation of the accessing device, and a position of the accessing device. The device holding pattern represents how a hand of the user is holding the device attempting to access the resource, where one or more sensors on the device can capture a holding pattern. Alternative, a holding camera can be based on one or more cameras and/or one or more light sensors being covered by a user on the device attempting to access the resource. For example, a device holding pattern can include covering a front camera and front light sensor on a smartphone. A gesture type represents how the accessing device is motioned (e.g., clockwise circular, side-to-side) by the user near an authenticating device or how a gesture is captured by a camera on the accessing device. A proximity the authenticating device can includes a user defined distance for the user holding the accessing device with respect to the authenticating device (e.g., 1-inch to 6-inch range). An orientation of the accessing device represents a degree value (e.g., 90 degrees) for a position of the accessing device with respect to the authenticating device, where the degree value is calculated based on deviation from an upright position (i.e., 0 degrees) of the accessing device and the authenticating device. A position of the accessing device represents a location of the accessing device with respect to the authenticating device, such as, above the authenticating device, over the authenticating device, below the authenticating device, and to a side of the authenticating device. The WPT signal is coded utilizing variations in the emitted electromagnetic fields (e.g., two distinctly different frequencies with varying amounts of ions) to include a bit representation for a unique identifier for the device and/or a user of the device, along with the context for the device.

In one example, an authenticating device is associated with a smart lock, where a user is attempting to open the smart lock with a smart phone. The opening the smart lock represents the resource being accessed and the smart phone represents the device attempting to access the resource requiring authentication by the authenticating device. The smart phone sends a WPT signal with variations in the emitted electromagnetic fields that includes a bit representation for a serial number (i.e., unique identifier) for the smart phone and an orientation for the smart phone (i.e., 180 degrees), where WPT authentication program 110 authenticates the smart phone based on the serial number and orientation to open the smart lock (i.e., grant access to the resource). In another example, an authenticating device is associated with a server computer located at a customer site, where a user is attempting to access the server computer locally at the customer site with a tablet computer. Locally accessing the server computer represents the resource and the tablet computer represents the device attempting to access the resource requiring authentication by the authenticating device. The tablet computer sends a WPT signal with variations in the emitted electromagnetic fields that includes a bit representation for a username and password for accessing the server computer and a holding pattern that includes a rear facing camera being block, where WPT authentication program 110 authenticates the tablet computer based on the provided username, password, and holding pattern.

WPT authentication program 110 translates the WPT signal (204). WPT authentication program 110 translates the WPT signal sent by the integrated transmitter on the accessing device to the integrated receiver on the authenticating device, where the WPT signal include a bit representation of information for a single or multi-factor authentication. WPT authentication program 110 analyzes the WPT signal, extracts the bit representation of information for a single or multi-factor authentication, and converts the bit representation to values utilized for the authentication of the accessing device. For a single factor authentication, WPT authentication program 110 analyzes the WPT signal received by the authenticating device from the accessing device, extracts a bit representation of a unique identifier from the WPT signal, and converts the bit representation of the unique identifier to the unique identifier for the accessing device. In one example, WPT authentication program 110 analyzes the WPT signal received by the authenticating device on a smart lock from a smartphone, extracts a bit represent of a serial number for the smart phone from the WPT signal, and converts the bit representation of the serial number to the serial number of "A123456789BC" for the smartphone. WPT authentication program 110 utilizes the serial number for the smartphone for authentication to open the smart lock (i.e., grant access to the resource). In another example, WPT authentication program 110 analyzes the WPT signal received by the authenticating device on a server computer from a tablet computer, extracts a bit represent of a username and password combination for the tablet computer from the WPT signal, and converts the bit representation of the username and password combination to the username and password credentials for authenticating the tablet computer. WPT authentication program 110 utilizes the username and password combination for authentication to grant the tablet computer access to the server computer.

For a multi-factor authentication, WPT authentication program 110 analyzes the WPT signal received by the authenticating device from the accessing device, extracts a bit representation of a unique identifier and context from the WPT signal, and converts the bit representation of the unique identifier and context to the unique identifier for the accessing device. In one example, WPT authentication program 110 analyzes the WPT signal received by the authenticating device on a smart lock from a smartphone, extracts a bit represent of a serial number for the smart phone and an orientation for the smartphone from the WPT signal, and converts the bit representation of the serial number and orientation to the serial number of "A123456789BC" and the orientation of 180 degrees for the smartphone. WPT authentication program 110 utilizes the serial number and orientation for the smartphone for authentication to open the smart lock. In another example, WPT authentication program 110 analyzes the WPT signal received by the authenticating device on a server computer from a tablet computer and extracts a bit represent of a username and password combination, along with a holding pattern for the tablet computer from the WPT signal. WPT authentication program 110 converts the bit representation of the username and password combination to "NAMEABC" and "PASSWORD123", along a holding pattern of having a rear camera blocked by a user's finger, for authenticating the tablet computer. WPT authentication program 110 utilizes the username and password combination, along with the holding pattern for authentication to grant the tablet computer access to the server computer.

WPT authentication program 110 authenticates the device based on the translated signal (206). WPT authentication program 110 authenticates the device based on the translated signal by comparing the single factor or multi-factor authentication credentials to a master list for accessing the resource. For a single factor authentication, WPT authentication program 110 authenticates the device based on the translated signal with the unique identifier for the accessing device by comparing the unique identifier to a master list with unique identifiers with allowed access to the resource. For a multi-factor authentication, WPT authentication program 110 authenticates the device based on the translated signal with the unique identifier and context for the accessing device by comparing the unique identifier and context to a master list with unique identifiers and associated context with allowed access to the resource.

WPT authentication program 110 determines whether the device attempting to access the resource is authenticated (decision 208). For a single factor authentication, WPT authentication program 110 compares the unique identifier to a master list with unique identifiers with allowed access to the resource and determines whether the received unique identifier for the accessing device is present on the master list. For a multi-factor authentication, WPT authentication program 110 compares the unique identifier and context to a master list with unique identifiers and associated context with allowed access to the resource and determines whether the receives unique identifier with associated context is present on the master list. In the event WPT authentication program 110 authenticates the device attempting to access the resource ("yes" branch, decision 208), WPT authentication program 110 grants access to the resource (210). In one example, WPT authentication program 110 grants access to the resource by opening a smart lock associated with the authenticating device that received the WPT signal from the smart phone. In another example, WPT authentication program 110 grants access to the resource by displaying a user interface for the server computer associated with the authenticating device that received the WPT signal from the tablet computer. In the event WPT authentication program 110 fails to authenticate the device attempting to access the resource ("no" branch, decision 208), WPT authentication program 110 denies access to the resource (212). In one example, WPT authentication program 110 denies access to the resource by not opening a smart lock associated with the authenticating device that received the WPT signal from the smart phone. In another example, WPT authentication program 110 denies access to the resource by restricting access to the server computer associated with the authenticating device that received the WPT signal from the tablet computer and notifying a client regarding the failed authentication of the accessing device.

Figure 3A:
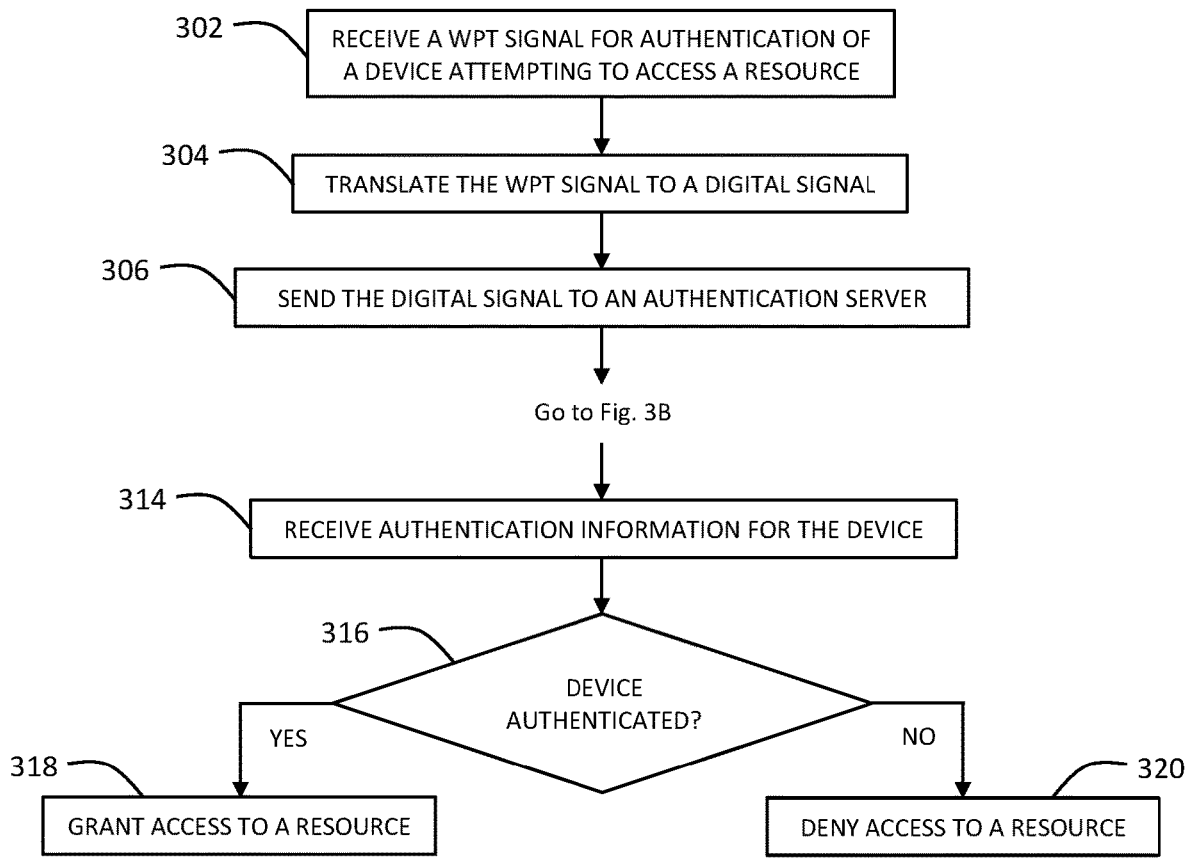
FIG. 3A is a flowchart depicting operational steps of a wireless power transmission program operating on an authenticating device for authenticating a device attempting to access a resource, in accordance with an embodiment of the present invention.

FIG. 3A is a flowchart depicting operational steps of a wireless power transmission program operating on an authenticating device for authenticating a device attempting to access a resource, in accordance with an embodiment of the present invention.

WPT authentication program 110 receives a WPT signal for authentication of a device attempting to access a resource (302). Similar to the embodiments discussed with regards to FIG. 2, for a single factor authentication of the device attempting to access the resource (i.e., an accessing device), the device sends a WPT signal via an integrated transmitter to an integrated receiver on an authenticating device 106 with a unique identifier to authenticate the device. The WPT signal is coded utilizing variations in the emitted electromagnetic fields (e.g., two distinctly different frequencies with varying amounts of ions) to include a bit representation for a unique identifier for the device and/or a user of the device. For a multi-factor authentication of the device attempting to access the resource (i.e., an accessing device), the device sends a WPT signal via an integrated transmitter to an integrated receiver on an authenticating device 106 with a unique identifier to authenticate the device and context for the device.

WPT authentication program 110 translates the WPT signal to a digital signal (304). WPT authentication program 110 translates the WPT signal sent by the integrated transmitter on the accessing device to the integrated receiver on the authenticating device, where the WPT signal include a bit representation of information for a single or multi-factor authentication. WPT authentication program 110 analyzes the WPT signal, extracts the bit representation of information for a single or multi-factor authentication, and converts the bit representation to a digital signal. WPT authentication program 110 sends the digital signal to an authentication server (306), where the authentication server authenticates the accessing device utilizing the process discussed with regards to FIG. 3B. Prior to WPT authentication program 110 sending the digital signal with the authentication information for the accessing device, WPT authentication program 110 encrypts the authentication information with an encryption key that is sent to the authentication server.

WPT authentication program 110 receives authentication information for the device (314). WPT authentication program 110 receives, at the authenticating device, the authentication information for the accessing device from the authentication server. The authentication information indicates whether the accessing device has been authenticated or failed an authentication for accessing the resource associated with the authenticating device. WPT authentication program 110 can receive encrypted authentication information, along with an encryption key for decrypting the authentication information. Utilizing an authentication server ensures an authentication process for the accessing device occurs at a remote location compared to a local location on the authenticating device itself, as discussed in the embodiments with regards to FIG. 2.

WPT authentication program 110 determines whether the device attempting to access the resource is authenticated (decision 316). In the event WPT authentication program 110 authenticates the device attempting to access the resource ("yes" branch, decision 316), WPT authentication program 110 grants access to the resource (318). In one example, WPT authentication program 110 grants access to the resource by opening a smart lock associated with the authenticating device that received the WPT signal from the smart phone. In another example, WPT authentication program 110 grants access to the resource by displaying a user interface for the server computer associated with the authenticating device that received the WPT signal from the tablet computer. In the event WPT authentication program 110 fails to authenticate the device attempting to access the resource ("no" branch, decision 316), WPT authentication program 110 denies access to the resource (320). In one example, WPT authentication program 110 denies access to the resource by not opening a smart lock associated with the authenticating device that received the WPT signal from the smart phone. In another example, WPT authentication program 110 denies access to the resource by restricting access to the server computer associated with the authenticating device that received the WPT signal from the tablet computer and notifying a client regarding the failed authentication of the accessing device.

Figure 3B:
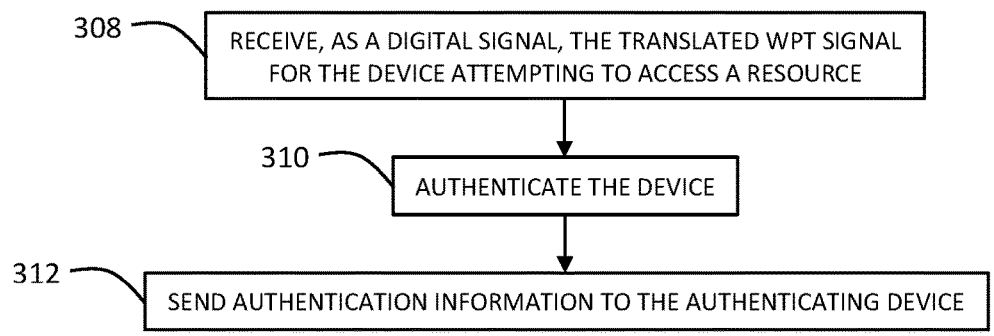
FIG. 3B is a flowchart depicting operational steps of a wireless power transmission program operating on a remote server for authenticating a device attempting to access a resource, in accordance with an embodiment of the present invention.

FIG. 3B is a flowchart depicting operational steps of a wireless power transmission program operating on a remote server for authenticating a device attempting to access a resource, in accordance with an embodiment of the present invention.

WPT authentication program 110 receives, as a digital signal, the translated WPT signal for the device attempting to access a resource (308). For a single factor authentication, WPT authentication program 110 receives the digital signal and translates the digital signal to a unique identifier for an accessing device. For a multi-factor authentication, WPT authentication program 110 receives the digital signal and translates the digital signal to a unique identifier and context for the accessing device.

WPT authentication program 110 authenticates the devices (310). WPT authentication program 110 authenticates the device based on the translated signal by comparing the single factor or multi-factor authentication credentials to a master list for accessing the resource. For a single factor authentication, WPT authentication program 110 authenticates the device based on the translated signal with the unique identifier for the accessing device by comparing the unique identifier to a master list with unique identifiers with allowed access to the resource. For a multi-factor authentication, WPT authentication program 110 authenticates the device based on the translated signal with the unique identifier and context for the accessing device by comparing the unique identifier and context to a master list with unique identifiers and associated context with allowed access to the resource. For a single factor authentication, WPT authentication program 110 compares the unique identifier to a master list with unique identifiers with allowed access to the resource and determines whether the received unique identifier for the accessing device is present on the master list. For a multi-factor authentication, WPT authentication program 110 compares the unique identifier and context to a master list with unique identifiers and associated context with allowed access to the resource and determines whether the receives unique identifier with associated context is present on the master list.

WPT authentication program 110 sends authentication information to the authenticating device (312). Prior to WPT authentication program 110 sending the digital signal with the authentication information for the accessing device, WPT authentication program 110 encrypts the authentication information with an encryption key that is sent to the authentication server.

Additional embodiments of the present invention utilize Wireless Power Transmission (WPT) devices in an environment that leverages the contextual inputs and user device capabilities to process authentication requests to access a resource. Additional embodiments of the present invention utilizing authenticating device that is enabled to accept the WPT signal and translate the signal into a digital signal which is validated on the authenticating device or on an authentication server in a server architecture. In a single factor authentication, when user is advised to provide a password, if there is a device nearby which is WPT enabled then the system creates a channel to replace password authentication with WPT based authentication. The device associated with the user generates the WPT signals with a predetermined amount of ions emitted in a defined rate (i.e., frequency). Upon the authenticating device receiving those signals, the received WPT signals are translated into digital signals and sent to an authentication server to validate those translated signals. Additional embodiments of the present invention alter the amount of ions emitted in the defined rate (i.e., frequency) based on the authenticating device and a resource being accessed.

For a multi-factor authentication system, based on device capability, application context, and user current context, the authentication server creates a bit representation and translates the bit representation into a WPT signal and sends to the authenticating device. Upon receiving WPT signal, the authenticating device converts the WPT signal to the bit representation to determine the defined rate of the ions emitted are. Additional embodiments of the present invention can utilize context to emit additional ions (e.g. an orientation of the device or a position of the device) and the device can emit the additional ions with the context for authentication to access the resource. Additional embodiments of the present invention can consider user contextual gestures which translates into a WPT signal and not only to help to authenticate the device but the contextual gesture enables one or more features and/or functions accessible to the device based on the specific contextual gesture provided. The contextual gestures are configurable by a user of the device prior to device authentication to access the resource. In some embodiment, on-going power consumption is utilized to provide different rates of ion transmissions by the device requiring authentication. Furthermore, in the event a WPT signal transfer is being unexpectedly interrupted or there is a drop of ion's shared between the device and the authenticating device, additional embodiments of the present invention immediately implement security measures to the authenticating device to avoid future unexpected interruptions.

Subsequent to detecting the user carrying the device for authentication is located in proximity to the authenticating device, additional embodiments of the present invention initiate a channel for validation of deceive, to authenticate the device before any initiation begins by the user to accelerate the authentication process. In a multi-user scenario, device authentication can occur by identifying if there are multiple users in surrounding where the WPT based authentication is to be performed and authenticating the device associated with the closest proximity to the authenticating device. In a non-liner queue, when receiving WPT based signals from the multiple devices, a line-of-sight for each device is established, and the device with a clear line of sight to the authenticating device is authenticated. Integration with wearable device or Internet of Things (IoT) devices, additionally context is provided with user data relating to a heart rate, gesture, expression, and any other device capturable data for the user of the device. Subsequent to detecting an external situation, the bit representation is blocked for authentication of the device and the authentication server is notified. The authentications server can identify biometric or finger-print authentication as a form of identifying a device and an biometric authentication performed on a user's device and sends the biometric data via a WPT signal for authentication by the authenticating device.

Additional embodiment of the present invention also provide an integrated environment, where the user device is enabled for WPT based authentication and gathers capabilities of an accessing device, such as, a device model, WPT capabilities, and battery percentage. Additional embodiments of the present invention capture the device contextual parameters of a user holding the accessing device that include a device holding pattern, a gesture type, a proximity with the authenticating device, and an active profile on the accessing device. Additional embodiments of the present invention can further capture environmental contextual parameters and subsequent to gathering all the information while in proximity to the authenticating device, perform the computation on gathered parameters and generates the contextual WPT signal. The accessing device transmits the WPT signal to the authenticating device on the established WPT secure channel. Subsequent to receiving the WPT signal over WPT secure channel, additional embodiments of the present invention translate the WPT signal to a digital signal and the accessing device is validated against a user configured rule for system authentication. Subsequent to successful validation, WPT channel (if configured) is terminated and the accessing device is granted access to the resource. The WPT channel while performing operations, keeps sending "keep-alive" WPT signals over the established secure WPT channel and (a) if there is a detected drop, re-establish the channel by following WPT protocol method (b) if a protocol failed, establish a lock on current operations and allow for non-WPT signal authentication to occur for the accessing device. Additional embodiments of the present invention allow users to define the various ion transmission rules for the WPT signal based on various user preferences like gesture patterns, a user's identity/profile, an application type, a transaction type, and a proximity with the authenticating device. As a result, enabling the computation engine to devise how many ions a device has to generate for the WPT signal and transmit based on derived contextual situations.

Figure 4:
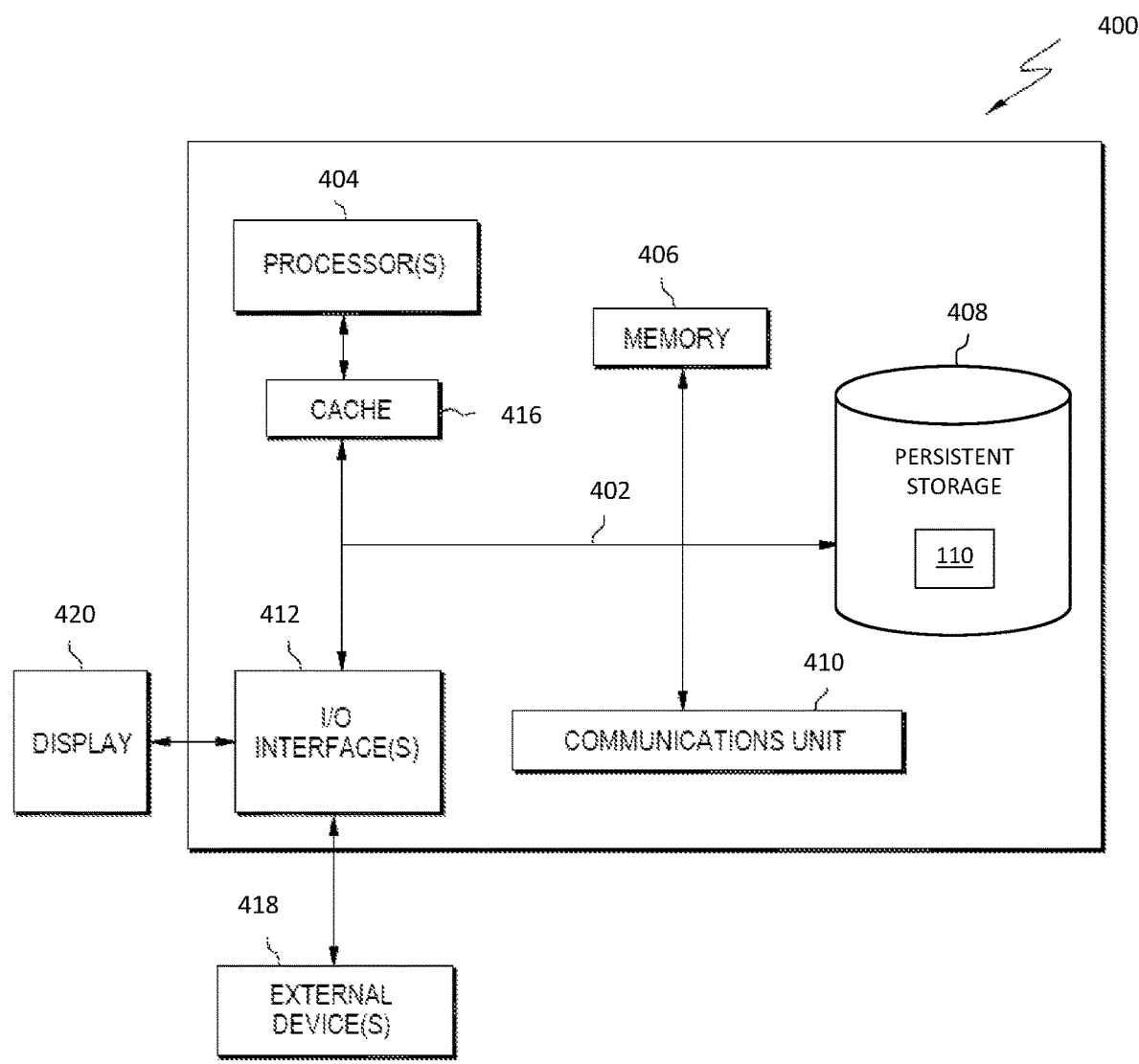
FIG. 4 is a block diagram of components of a computer system, such as the server computer of FIG. 1, in accordance with an embodiment of the present invention.

FIG. 4 depicts computer system 400, where server computer 102, accessing device 104, and authenticating device 104 are each an example of a computer system 400 that includes WPT authentication program 110. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
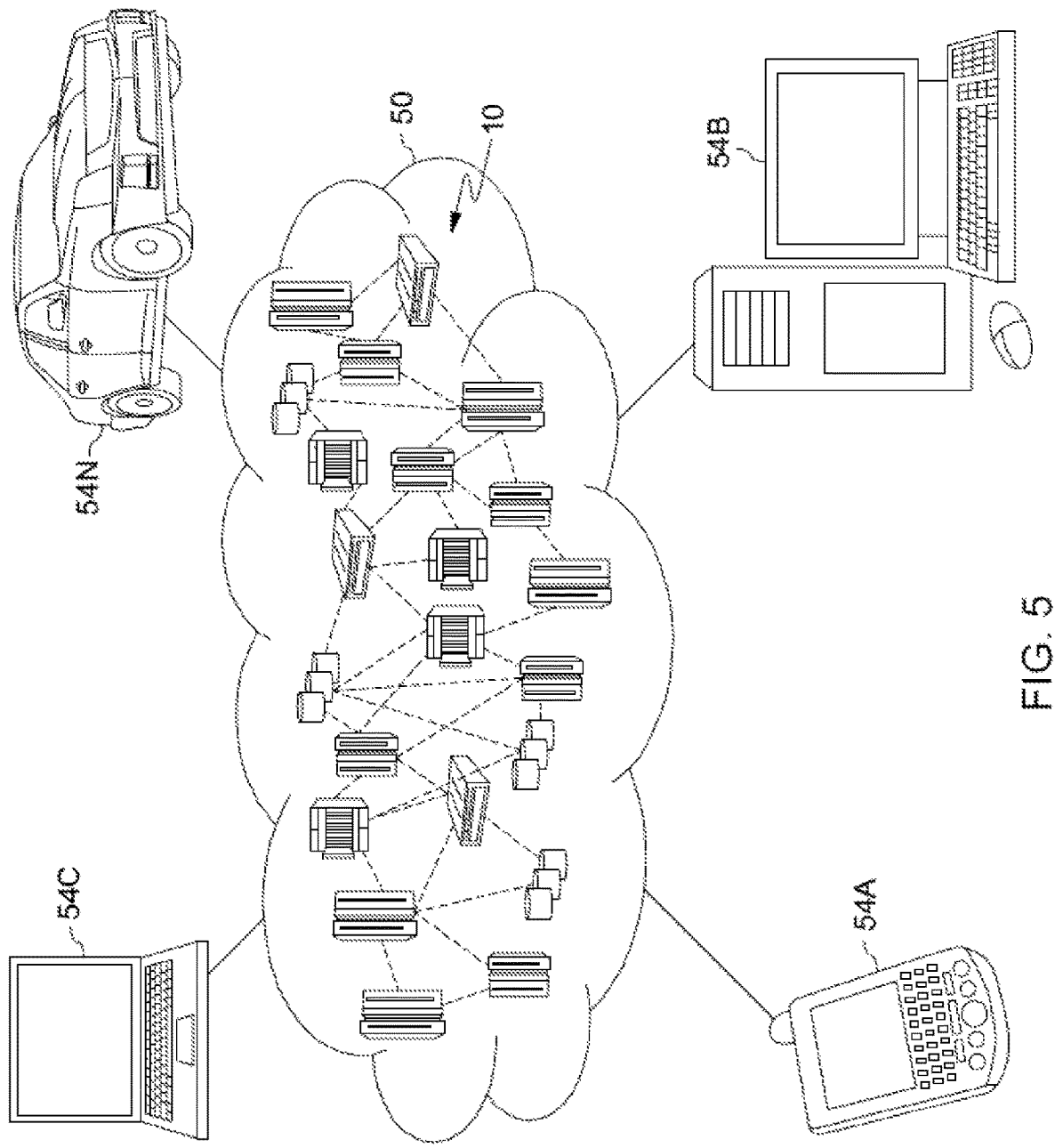
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
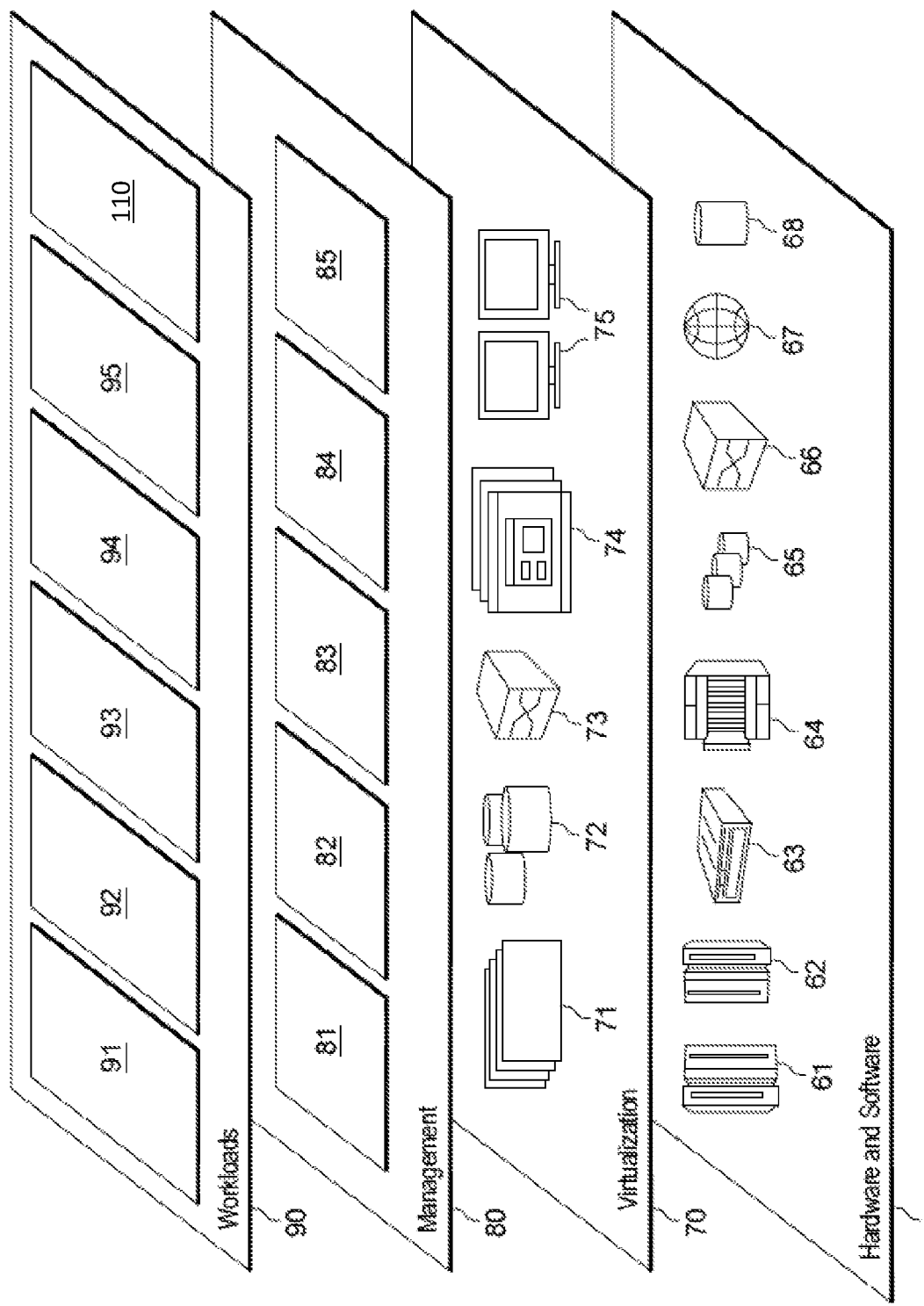
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and WPT authentication program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, at an authenticating device, a wireless power transmission signal for authentication of a user device attempting to accessing a resource, wherein the wireless power transmission signal includes a unique identifier for the user device;
translating, at the authenticating device, the wireless power transmission signal, wherein the unique identifier for the user device is embedded in the wireless power transmission signal as a bit representation based on a variation of two distinctly different frequencies in emitted electromagnetic fields; and
responsive to authenticating the user device based on a translated wireless power transmission signal, granting, the user device, access to the resource.

2. The computer-implemented method of claim 1, wherein translating the wireless power transmission signal further comprises:
 analyzing the wireless power transmission signal with the unique identifier for the user device;
 extracting the bit representation for the unique identifier for the user device; and
 converting the bit representation for the unique identifier to the unique identifier for the user device, wherein the unique identifier is associated with a serial number for the user device.

3. The computer-implemented method of claim 1, wherein translating the wireless power transmission signal further comprises:
 analyzing the wireless power transmission signal with the unique identifier for the user device;
 extracting the bit representation for the unique identifier for the user device; and
 converting the bit representation for the unique identifier to the unique identifier for the user device, wherein the unique identifier is associated with a username and a password for the user device.

4. The computer-implemented method of claim 1, wherein the wireless power transmission signal is coded utilizing variations in emitted electromagnetic fields to include the bit representation of the unique identifier for the user device.

5. The computer-implemented method of claim 1, wherein the wireless power transmission further includes context for the user device, the context is a user action performable on the user device.

6. The computer-implemented method of claim 5, wherein the context is selected from the group consisting of: a holding pattern for the user device, a gesture type, a proximity to the authenticating device, an orientation of the user device, and a position of the user device.

7. The computer-implemented method of claim 6, wherein translating the wireless power transmission signal further comprises:
 analyzing the wireless power transmission signal with the unique identifier and the context for the user device;
 extracting the bit representation for the unique identifier and the context for the user device; and
 converting the bit representation for the unique identifier and the context to the unique identifier and the context for the user device, wherein the unique identifier is associated with a serial number for the user device and the context is associated with one or more actions performed by a user.

8. The computer-implemented method of claim 6, wherein translating the wireless power transmission signal further comprises:
 analyzing the wireless power transmission signal with the unique identifier and the context for the user device;
 extracting the bit representation for the unique identifier and the context for the user device; and
 converting the bit representation for the unique identifier and the context to the unique identifier for the user device, wherein the unique identifier is associated with a username and a password for the user device and the context is associated with one or more actions performed by a user.

9. The computer-implemented method of claim 6, wherein the wireless power transmission signal is coded utilizing variations in emitted electromagnetic fields to include the bit representation of the unique identifier and the context for the user device.

10. The computer-implemented method of claim 1, further comprising:
 sending, by the authenticating device, the translated wireless power transmission signal as a digital signal to an authentication server for authenticating the user device based on the unique identifier; and
 receiving, by the authenticating device, authentication information for the user device from the authenticating server indicating whether the user device is authenticated based on the unique identifier.

11. The computer-implemented method of claim 1, further comprising:
 sending, by the authenticating device, the translated wireless power transmission signal as a digital signal to an authentication server for authenticating the user device based on the unique identifier and the context; and
 receiving, by the authenticating device, authentication information for the user device from the authenticating server indicating whether the user device is authenticated based on the unique identifier and the context.

12. A computer program product comprising one or more computer readable storage media and program instructions collectively stored on the one or more computer readable storage media, the stored program instructions executable by one or more computer processors, the stored program instructions comprising:
 receiving, at an authenticating device, a wireless power transmission signal for authentication of a user device attempting to accessing a resource, wherein the wireless power transmission signal includes a unique identifier for the user device;
 translating, at the authenticating device, the wireless power transmission signal, wherein the unique identifier for the user device is embedded in the wireless power transmission signal as a bit representation based on a variation of two distinctly different frequencies in emitted electromagnetic fields; and
 responsive to authenticating the user device based on a translated wireless power transmission signal, granting, the user device, access to the resource.

13. The computer program product of claim 12, wherein translating the wireless power transmission signal, the stored program instructions further comprises:
 analyzing the wireless power transmission signal with the unique identifier for the user device;
 extracting the bit representation for the unique identifier for the user device; and
 converting the bit representation for the unique identifier to the unique identifier for the user device, wherein the unique identifier is associated with a serial number for the user device.

14. The computer program product of claim 12, wherein translating the wireless power transmission signal, the stored program instructions further comprises:
 analyzing the wireless power transmission signal with the unique identifier for the user device;
 extracting the bit representation for the unique identifier for the user device; and
 converting the bit representation for the unique identifier to the unique identifier for the user device, wherein the unique identifier is associated with a username and a password for the user device.

15. The computer program product of claim 12, wherein the wireless power transmission signal is coded utilizing variations in emitted electromagnetic fields to include the bit representation of the unique identifier for the user device.

16. The computer program product of claim 12, wherein the wireless power transmission further includes context for the user device, the context is a user action performable on the user device.

17. The computer program product of claim 16, wherein the context is selected from the group consisting of: a holding pattern for the user device, a gesture type, a proximity to the authenticating device, an orientation of the user device, and a position of the user device.

18. The computer program product of claim 17, wherein translating the wireless power transmission signal, the stored program instructions further comprises:
    analyzing the wireless power transmission signal with the unique identifier and the context for the user device;
    extracting the bit representation for the unique identifier and the context for the user device; and
    converting the bit representation for the unique identifier and the context to the unique identifier and the context for the user device, wherein the unique identifier is associated with a serial number for the user device and the context is associated with one or more actions performed by a user.

19. The computer program product of claim 17, wherein translating the wireless power transmission signal, the stored program instructions further comprises:
    analyzing the wireless power transmission signal with the unique identifier and the context for the user device;
    extracting the bit representation for the unique identifier and the context for the user device; and
    converting the bit representation for the unique identifier and the context to the unique identifier for the user device, wherein the unique identifier is associated with a username and a password for the user device and the context is associated with one or more actions performed by a user.

20. A computer system comprising:
    one or more computer processors;
    one or more computer readable storage media; and
    program instructions stored on the computer readable storage media for execution by at least one of the one or more computer processors, the program instructions comprising:
    receiving, at an authenticating device, a wireless power transmission signal for authentication of a user device attempting to accessing a resource, wherein the wireless power transmission signal includes a unique identifier for the user device;
    translating, at the authenticating device, the wireless power transmission signal, wherein the unique identifier for the user device is embedded in the wireless power transmission signal as a bit representation based on a variation of two distinctly different frequencies in emitted electromagnetic fields; and
    responsive to authenticating the user device based on a translated wireless power transmission signal, granting, the user device, access to the resource.

* * * * *